United States Patent
King

(10) Patent No.: US 6,207,443 B1
(45) Date of Patent: *Mar. 27, 2001

(54) METHOD FOR INITIATING HEAP BIOLEACHING OF SULFIDIC ORES

(75) Inventor: James A. King, West Vancouver (CA)

(73) Assignee: Placer Dome, Inc., Vancouver (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,448

(22) Filed: Mar. 2, 1998

(51) Int. Cl.[7] ............................................. E21B 43/28
(52) U.S. Cl. ........................... 435/262; 75/710; 75/712; 75/743; 75/744; 75/DIG. 17
(58) Field of Search ............................. 435/262; 75/710, 75/712, 743, 744, DIG. 17

(56) References Cited

U.S. PATENT DOCUMENTS

| | | |
|---|---|---|
| 2,829,964 | 4/1958 | Zimmerley et al. . |
| 4,039,406 | 8/1977 | Stanley et al. .................... 204/108 |
| 4,091,070 | 5/1978 | Riggs et al. ........................ 423/41 |
| 4,120,935 | 10/1978 | Fountain et al. ................... 423/41 |
| 4,177,068 | 12/1979 | Balakrishnan et al. ............. 75/105 |
| 4,374,097 | 2/1983 | Holland ............................. 423/22 |
| 4,497,778 | 2/1985 | Pooley ............................... 423/27 |
| 4,571,387 | 2/1986 | Bruynesteyn et al. ............. 435/262 |
| 4,729,788 | 3/1988 | Hutchins et al. .................. 75/118 |
| 4,875,935 | 10/1989 | Gross et al. ........................ 75/117 |
| 4,888,293 | 12/1989 | Hackl et al. ..................... 435/245 |
| 5,055,130 | 10/1991 | Arnold et al. ..................... 75/744 |
| 5,162,105 | 11/1992 | Kleid et al. ........................ 423/29 |
| 5,246,486 | 9/1993 | Brierley et al. ..................... 75/743 |
| 5,316,567 | 5/1994 | Jones ................................. 75/743 |
| 5,332,559 | 7/1994 | Brierley et al. .................... 423/27 |
| 5,354,359 | 10/1994 | Wan et al. ........................... 75/744 |
| 5,573,575 | 11/1996 | Kohr ................................. 75/712 |
| 5,873,927 | 2/1999 | Schaffner et al. ................. 75/710 |

FOREIGN PATENT DOCUMENTS 872-94  3/1995 (CL) .

OTHER PUBLICATIONS

James A. Brierley and Rong Yu Wan; Enhanced Recover of Gold from a Refractory Sulfidic–Carbonaceous Ore Using Bacterial Pretreatment and Thiourea Extraction; pp. 463–466.

S.R. Hutchins, J.A. Brierley and C.L. Brierley; Microbial Pretreatment of Refractory Sulfide and Carbonaceous Ores Improves the Economics of Gold Recovery; Apr. 1988; pp. 249–254.

A. Kontopouls and M. Stefanakis; Process Options for Refractory Sulfide Gold Ores: Technical, Environmental and Economic Aspects; 1990; pp. 393–412.

E.N. Lawson, J.L. Taylor and G.A. Hulse; Biological Pre–Treatment for the Recovery of Gold from Slimes Dames; Feb. 1990; pp. 45–49.

J.M. Weston, et al. "Continuous biological leaching of copper from a chalcocite ore and concentrate in a saline environment"; Proceedings of Copper 92–Cobre 92 International Conference, vol. III—Electrorefining and Hydrometallurgy of Copper; pp. 377–392.

Primary Examiner—David A. Redding
(74) Attorney, Agent, or Firm—Sheridan Ross P.C.

(57) ABSTRACT

The process of the present invention "jump starts" heap biooxidation of sulfides by incorporating a previously biooxidized material into the heap. The process can be used to recover precious and/or base metals from sulfidic ores and concentrate.

20 Claims, 3 Drawing Sheets

METHOD FOR INITIATING HEAP BIOLEACHING OF SULFIDIC ORES

FIELD OF THE INVENTION

The present invention is directed generally to bioleaching of sulfidic ores and specifically to heap and vat bioleaching of sulfidic ores.

BACKGROUND OF THE INVENTION

A major source of many metals, particularly copper and gold, is sulfidic ores. In sulfidic ores, the metals are either present as or immobilized by stable metal sulfides, which are frequently nonreactive or slow reacting with lixiviants such as cyanide, ferric ion or sulfuric acid. To promote the dissolution of the metals in a lixiviant, the elements compounded with the metal (e.g., sulfide sulfur) are first be oxidized. In one approach, oxidation of the sulfide sulfur is induced by organisms, such as *Thiobacillus Ferrooxidans* and *Thiobacillus Thiooxidans* (commonly referred to as biooxidation or bioleaching).

Although biooxidation can be performed in a continuous stirred tank reactor, a common technique is to perform biooxidation in a heap. Compared to biooxidation in a continuous stirred reactor, heap biooxidation generally has lower capital and operating costs but a longer residence time and lower overall oxidation rate for the sulfide sulfur in the feed material.

In designing a heap biooxidation process, there are a number of considerations. First, it is desirable to have a relatively high heap permeability and porosity. Fine material can decrease heap permeability and porosity and result in channeling. Channeling can cause a portion of the material in the heap to have a reduced contact with the lixiviant, thereby limiting the degree of biooxidation of the material. Second, it is desirable that the residence time of the feed material in the heap (i.e., the time required for an acceptable degree of biooxidation) be as low as possible. Existing heap leaching processes typically have residence times of the heap on the pad of 12 months or more for an acceptable degree of biooxidation to occur.

SUMMARY OF THE INVENTION

These and other objectives are addressed by the process of the present invention. The process includes the steps of:

(a) biooxidizing a first portion of a feed material containing metal sulfides to form a biooxidized fraction;

(b) combining the biooxidized fraction and a second portion of the feed material to form a combined feed material; and (c) thereafter biooxidizing the combined feed material.

The metal in the metal sulfides can be copper, gold, silver, nickel, zinc, arsenic, antimony, and mixtures thereof. As will be appreciated, precious metals, such as gold, generally are not compounded with sulfide sulfur but are rendered immobile in the lixiviant by close association with metal sulfides, especially pyrite and arsenopyrite.

Because the biooxidized fraction includes large active cultures of organisms, such as *Thiobacillus Ferrooxidans; Thiobacillus Thiooxidans; Thiobacillus Organoparus; Thiobacillus Acidphilus; Sulfobacillus Thermosulfidooxidans; Sulfolobus Acidocaldarius, Sulfolobus BC; Sulfolobus Solfataricus; Acidanus Brierley; Leptospirillum Ferrooxidans;* and the like for oxidizing the sulfide sulfur and other elements in the feed material, the combination of the biooxidized fraction and the second portion of the feed material (which typically has not been biooxidized) "jump starts" the biooxidation of the second portion. In other words, the time required to substantially complete biooxidation of the second portion is significantly reduced relative to existing heap leaching processes, thereby reducing heap pad area and capital and operating costs.

The biooxidation in step (a) can be performed in a continuous stirred reactor or on a heap. A continuous stirred reactor is preferred because of the relatively rapid rate of biooxidation in such reactors and the high concentration of microbes on the biooxidized residue. After inoculation of the slurried portion of the feed material, the continuous stirred reactor preferably is sparged with oxygen and supplied with suitable nutrients for the microbes to foster biooxidation.

Typically, the second portion of the feed material has not been biooxidized. In one embodiment, the second portion is coarsely sized while the biooxidized fraction (i.e., the first portion) is finely sized. The biooxidized fraction typically has a $P_{80}$ size preferably ranging from about 5 to about 200 microns and more preferably from about 10 to about 200 microns while the second fraction has a $P_{80}$ size in excess of that of the biooxidized fraction.

The combining step can be performed in a number of ways. For example, the biooxidized fraction can be agglomerated with the second portion of the feed material. "Agglomeration" refers to the formation of particles into a ball (i.e., an agglomerate), with or without the use of a binder. Alternatively, the biooxidized fraction can be placed on the conveyor belts along with the second portion of the feed material and be carried by the belts to the heap.

In another embodiment, the process includes the step of floating a portion of the feed material to form a tailing fraction and a concentrate fraction. The first portion of the feed material includes the concentrate fraction. A substantial portion of the fine material is discarded in the tailing fraction so that the porosity and permeability of the heap remains unaffected by the fine size of the relatively small quantity of concentrate fraction (which is incorporated into the heap after partial or complete biooxidation of the concentrate fraction). Commonly, the first portion of the feed material constitutes no more than about 15 wt % of the feed material while the concentrate fraction constitutes no more than about 30 wt % of the first portion (i.e., no more than about 4.5 wt % of the feed material). Accordingly, the tailing fraction constitutes at least about 70 wt % of the first portion.

DETAILED DESCRIPTION

Figure 1:
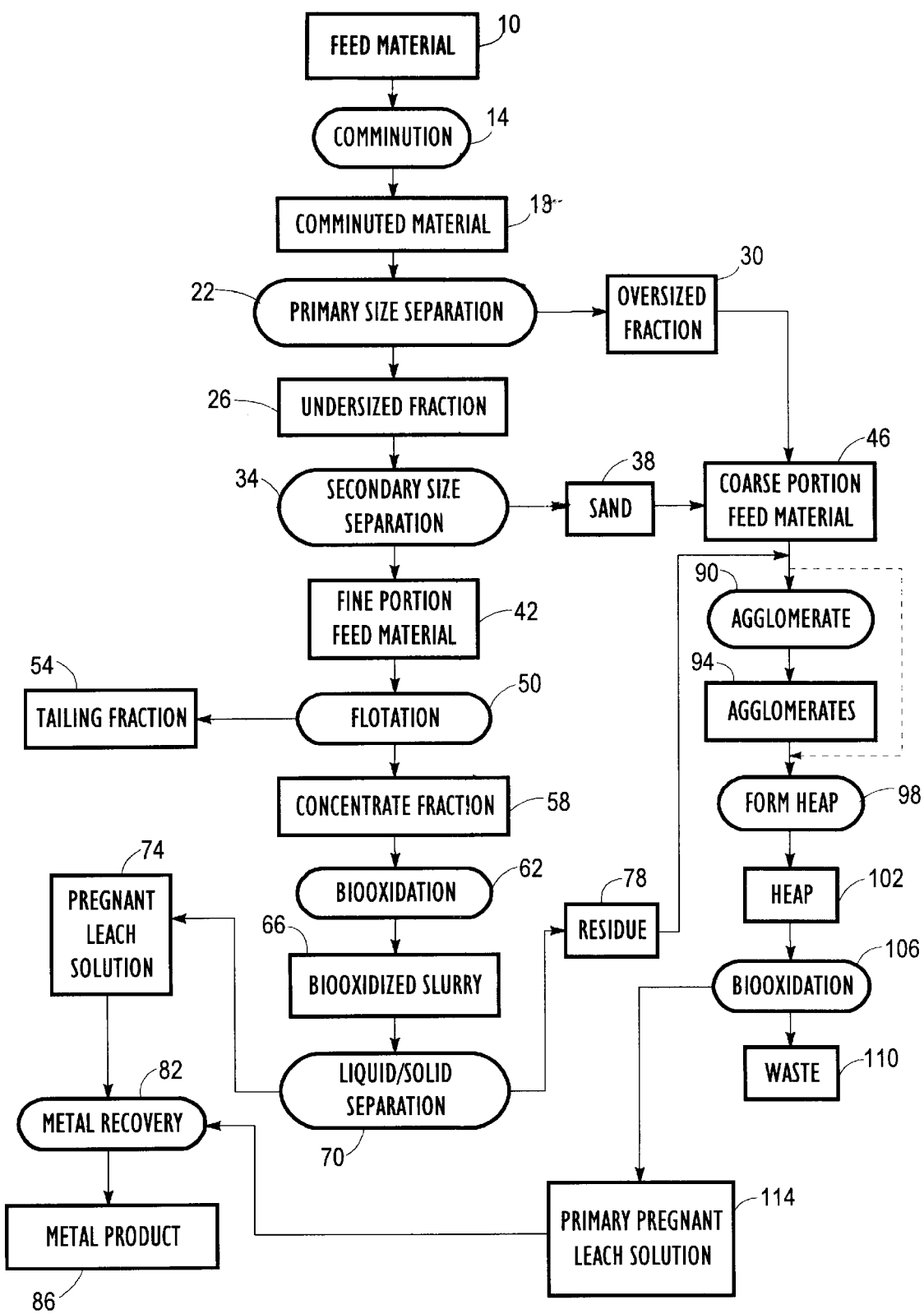
FIG. 1 depicts an embodiment of the present invention for the recovery of base metals.

Referring to FIG. 1, an embodiment of the present invention is depicted for recovering base metals from sulfidic ores. The recoverable base metals include copper, iron, nickel, zinc, antimony, arsenic, and mixtures thereof. The metal generally occurs in the ore as a metal sulfide, such as chalcopyrite ($CuFeS_2$), bornite ($Cu_5FeS_4$), chalcocite ($Cu_2S$), digenite ($CU_9S_5$), covellite (CuS), and the like.

A feed material 10 containing the metal sulfide is comminuted 14 to produce a comminuted material 18. The $P_{80}$ size of the comminuted material preferably ranges from about 5 to about 20 mm.

The comminuted material 18 is subjected to primary size separation 22 to form an undersized fraction 26 and an oversized fraction 30. Primary size separation 22 can be performed by any suitable technique, with screening being most preferred. The preferred screen size ranges from about 1 to about 3 mm. Typically, the undersized fraction 26 represents no more than about 30 wt % of the comminuted feed material 18 while the oversized fraction 30 represents at least about 70 wt % of the comminuted feed material 18.

The undersized fraction 26 is subjected to secondary size separation 34 to produce a sand 38 and a fine portion 42 of the feed material. Secondary size separation 34 can be performed by any suitable techniques such as by cycloning or screening. The secondary size separation 34 is performed such that the fine portion 42 represents no more than about 20 wt % of the undersized fraction 26. The secondary size separation 34 is typically performed such that the fine portion 42 has a $P_{80}$ size ranging from about 5 to about 200 microns.

The sand 38 is combined with the oversized fraction 30 to form a coarse portion 46 of the feed material. Preferably, the coarse portion 46 represents at least about 90 wt % of the comminuted feed material 18.

The fine portion 42 is subjected to flotation 50 to produce a tailing fraction 54 and a concentrate fraction 58. As will be appreciated, the concentrate fraction 58 contains most of the metal sulfide and preferably at least about 80% of the metal sulfide in the fine portion 42. The collectors and frothers and conditions used during flotation 50 depend, of course, on the particular metal sulfide being recovered. They may include, but are not limited to, xanthates and dithiophosphates. Typically, the concentrate fraction 58 constitutes no more than about 20 wt % of the fine portion 42.

The concentrate fraction 58 is slurried and biooxidized 62 in a series of continuous stirred tank reactors, to produce a biooxidized slurry 66. Biooxidation 62 is preferably conducted at a slurry temperature ranging from about 20 to about 60° C.; a slurry pH ranging from about pH 1.2 to about pH 2.5; and a sulfuric acid content in the slurry ranging from about 1 to about 20 g/l. During biooxidation 62, air is sparged through the slurry to provide molecular oxygen for biooxidation. The slurry further includes microbes and suitable energy source and nutrients for the microbes, namely from about 0.1 to about 10 g/l of $Fe^{2+}$; from about 0.1 to about 10 g/l of ammonium sulfate $(NH_4)_2 SO_3$, from about 0.05 to about 5 g/l of a phosphate.

The microbes that can be used for biooxidation are discussed in U.S. Pat. No. 5,246,486 entitled "Biooxidation Process for Recovery of Gold from Heaps of Low-Grade Sulfidic and Carbonaceous Sulfidic Ore Materials", which is incorporated herein by this reference. The microbes include *Thiobacillus Ferrooxidans; Thiobacillus Thiooxidans; Thiobacillus Organoparus; Thiobacillus Acidphilus; Sulfobacillus Thermosulfidooxidans; Sulfolobus Acidocaldarius, Sulfolobus BC; Sulfolobus Sulfataricus; Acidanus Brierley; Leptospirillum Ferrooxidans*; and the like. The microbes can be classified as either, (a) facultative thermophile, i.e., the microbe is capable of growth at mid-range temperatures (e.g., about 30° C.) and high (thermophilic) temperatures (e.g., above about 50° C. to about 55° C.) or (b) obligate thermophile which are micro-organisms which can only grow at high (themophilic) temperatures (e.g., greater than about 50° C.).

The biooxidized slurry 66 is subjected to liquid/solid separation 70 to form a pregnant leach solution 74 and a biooxidized residue 78. The pregnant leach solution 74 is subjected to metal recovery 82 to produce a metal product 86. Metal recovery 82 can be performed by any suitable technique including solvent extraction/electrowinning.

The biooxidized residue 78, which contains active cultures of microbes, is combined with the coarse portion 46 of the feed material to form a combined feed material. The combined material can be agglomerated 90 with or without a suitable binder to form agglomerates 94. The combined feed material can be contacted with additional microbes prior to agglomeration. In some cases, it may be desirable to introduce different cultures of microbes that flourish at temperatures different from the cultures of microbes present on the biooxidized residue 78. As will be appreciated, a temperature profile will generally exist in the heap.

As shown in FIG. 1, the biooxidized material can alternatively be placed directly on a conveyor belt to the heap along with the second portion of the feed material or on top of the heap formed from the second portion of the feed material.

The agglomerates 98 are formed into a heap 102. The heap 102 is formed on a lixiviant-impervious liner, and an irrigation system for the lixiviant is erected on the heap. A cooling and/or heating system can be installed on the process solution flowstream for temperature control. Air may be introduced to the body of the heap through a pipe network under positive pressure to promote ingress of molecular oxygen through the heap.

The heap 102 is biooxidized 106 to produce a solid waste material 110 and a primary pregnant leach solution 114 containing most of the metal values in the comminuted material 18. Biooxidation is performed by applying a lixiviant, preferably sulfuric acid and containing an innoculate capable of biooxidizing sulfide sulfur and other elements compounded with the metal and/or nutrients for the microbes, to the top of the heap; percolating the lixiviant and nutrients through the heap; and removing the primary pregnant leach solution 114 from the base of the heap 102.

For optimal results, the conditions in the heap 102 are carefully controlled. The lixiviant preferably has a pH less than about pH 2.5 and more preferably ranging from about pH 1.3 to about pH 2.0. The lixiviant can include from about 1 to about 10 g/l of ferric ion sulfate to aid in the dissolution of metals. The lixiviant can also contain an energy source and nutrients for the microbes, such iron sulfate,ammonium sulfate and phosphate.

If the combined feed material contains significant amounts of arsenic, the arsenic can be removed by coprecipitation with iron under suitable conditions. Typically, pentavalent arsenic and trivalent iron will coprecipitate when the solution ratio of Fe:As exceeds 4:1 and the solution pH exceeds 3.

The primary pregnant leach solution 114 can be subjected to metal recovery 82 to produce the metal product 86. When biooxidation is complete, the fully biooxidized material in the heap becomes waste material 110.

Figure 2A:
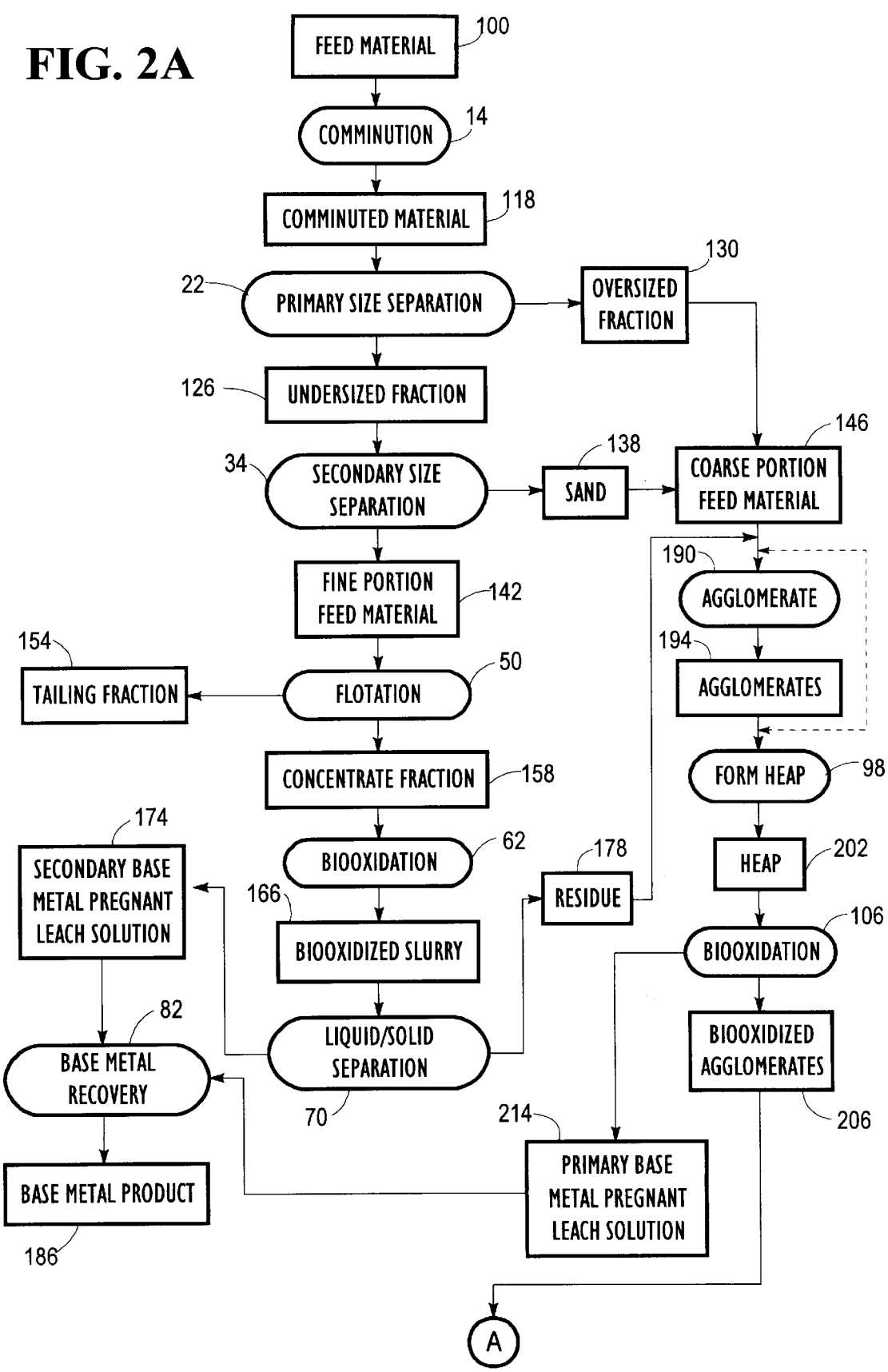
FIGS. 2A and B depict an embodiment of the present invention for the recovery of base and/or precious metals.
Figure 2B:
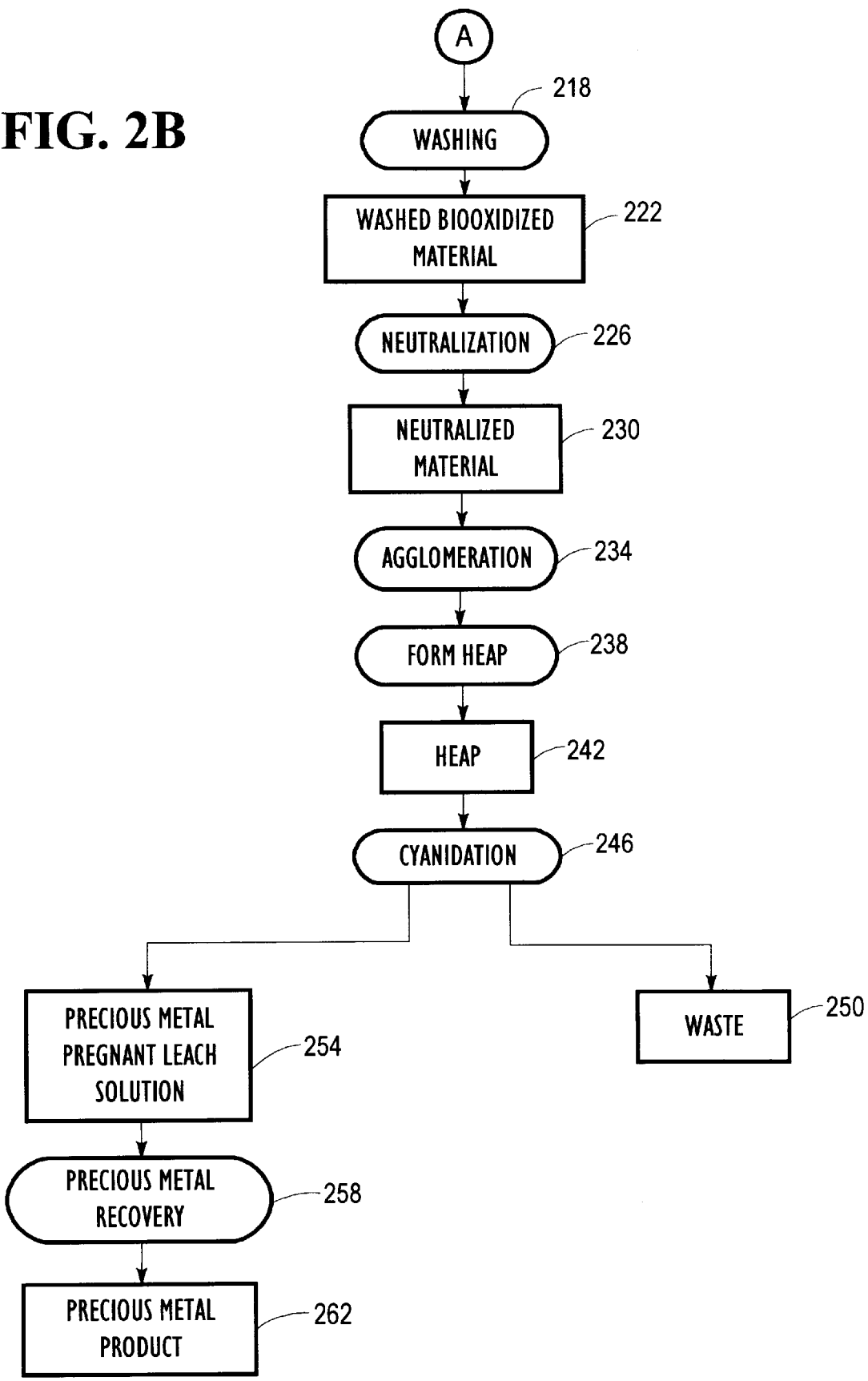

FIGS. 2A and B depict a second embodiment of the present invention for recovering precious and base metals from a sulfidic feed material. The feed material 100 is comminuted 14 to form a comminuted material 118. The comminuted material 118 is subjected to primary size separation 22 to form an oversized fraction 130 and an undersized fraction 126. The undersized fraction 126 is subjected to secondary size separation 34 to produce sand 138 and a fine portion 142 of the feed material. The fine portion 142 is subjected to flotation 50 to form a tailing fraction 154 and a concentrate fraction 158. The concentrate fraction 158 is biooxidized 62 to form a biooxidized slurry 166, which is subjected to liquid/solid separation to form a secondary base metal pregnant leach solution 174 and a residue 178. The residue 178 contains most of the precious metal content of the fine portion 142 of the feed material.

The oversized fraction 130 and sand 138 are combined to form a coarse portion 146 of the feed material, and the coarse portion 146 is combined with the residue 178 and the combined material agglomerated 90 to form agglomerates 194. The agglomerates 194 are formed 98 into a heap 202. The heap is biooxidized 106 to form biooxidized agglomerates 206 and primary base metal pregnant leach solution 214. The primary and secondary base metal pregnant leach solution 174 is subjected to base metal recovery 82 to form a base metal product 186 where applicable.

The biooxidized agglomerates 206, which contain most of the precious metal content of the comminuted material 118, are repeatedly and thoroughly washed 218, preferably with an aqueous solution, to remove the lixiviant from the agglomerated particles and form washed biooxidized material 222. During washing, the agglomerates will commonly break apart, thereby facilitating lixiviant removal.

The washed biooxidized material 222 is neutralized 226 by contact with a base material to form neutralized material 230 and agglomerated 234 to form agglomerates 230. The base material, which is preferably lime, limestone, Portland cement, caustic soda, cement dust, or mixtures of these materials, can be utilized as a binder during agglomeration. As will be appreciated, neutralization is important as the washed biooxidized material 222 is fairly acidic and can cause uneconomically high cyanide consumption during cyanidation 246.

The agglomerates 234 are formed into a reconstituted heap 242 which is subjected to cyanidation 246 (using a cyanide lixiviant) to dissolve the precious metal in the agglomerates 234 in a precious metal pregnant leach solution 254. The precious metal pregnant leach solution 254 can be subjected to precious metal recovery 258 by known techniques to produce a precious metal product 262. After tyanidation 246 is completed, the agglomerates 234 can be discarded as waste material 250.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for recovering a metal from a sulfidic feed material containing the metal as a sulfide, comprising:
    (a) comminuting a feed material to form a comminuted material;
    (b) separating the comminuted material by screening into an oversized fraction and an undersized fraction, the oversized fraction having a mean particle size greater than the undersized fraction; wherein the undersized fraction constitutes no more than about 15% by weight of the feed material;
    (c) separating the undersized fraction into a coarse undersized fraction and a fine undersized fraction, the coarse undersized fraction having a mean particle size greater than the fine undersized fraction; (d) floating at least a portion of the fine undersized fraction to form a tailing fraction and a concentrate fraction, wherein the fine undersized fraction has a $P_{80}$ size ranging from about 10 to about 200 microns;
    (e) at least partially biooxidizing at least a portion of the concentrate fraction to form a biooxidized fraction, wherein the biooxidized fraction includes an organism for oxidizing the sulfide sulfur in the feed material;
    (f) combining at least a portion of the biooxidized fraction, which includes the organism, and at least a portion of the oversized fraction of the feed material to form a combined feed material; and
    (g) thereafter biooxidizing the combined feed material.

2. The process of claim 1, wherein the at least a portion of the oversized fraction of the feed material is free of biooxidation in a reactor.

3. The process of claim 1, wherein in the thereafter biooxidizing step (g) the biooxidized fraction is in the form of a slurry and the biooxidized fraction is no more than about 30 wt. % of the undersized fraction.

4. The process of claim 1 wherein the organism is selected from the group consisting of *Thiobacillus Ferrooxidans; Thiobacillus Thiooxidans, Leptospirillum Ferrooxidans; Thiobacillus Organoparus; Thiobacillus Acidphilus; Sulfobacillus Thermosulfidooxidans; Sulfolobus Acidocaldarius, Sulfolobus BC; Sulfolobus Solfataricus; Acidanus Brierley*; and mixtures thereof and the concentrate fraction is no more than about 4.5% of the feed material.

5. The process of claim 1, wherein the combining step (f) comprises agglomerating the at least a portion of the biooxidized fraction and the at least a portion of oversized fraction of the feed material.

6. The process of claim 1, wherein the oversized fraction is free of flotation.

7. A process for recovering a metal from a feed material containing sulfides, comprising:
    (a) separating the feed material into a coarse fraction and a fine fraction, the coarse fraction having a larger mean particle size than the fine fraction and the fine fraction constituting no more than about 30% by weight of the feed material wherein the $P_{80}$ size of the feed material ranges from about 5 to about 20 mm and the separation is performed using one or more screens having an aperture size ranging from about 1 to about 3 mm;
    (b) floating at least a portion of the fine fraction to form a tailing fraction and a concentrate fraction, wherein the fine fraction has a $P_{80}$ size ranging from about 5 to about 200 microns and the concentrate fraction constitutes no more than about 5 wt. % of the feed material;
    (c) at least partially biooxidizing the concentrate fraction in a reactor to form a biooxidized fraction, wherein the biooxidized fraction includes an organism for oxidizing the sulfide sulfur in the concentrate fraction to form a first pregnant leach solution containing at least a portion of the metal in the concentrate fraction;
    (d) separating at least most of the first pregnant leach solution from the biooxidized fraction;
    (e) thereafter combining at least a portion of the biooxidized fraction, which includes the organism, and at least a portion of the coarse fraction to form a combined feed material, wherein at least a portion of the coarse fraction has not been biooxidized in the reactor;
    (f) biooxidizing the combined feed material with a lixiviant to form a second pregnant leach solution containing at least a portion of the metal in the combined feed material; and
    (g) recovering the metal from the first and second pregnant leach solutions.

8. The process of claim 7, wherein the thereafter combining step (e) comprises agglomerating the at least a portion of the biooxidized fraction and the at least a portion of the coarse fraction.

9. The process of claim 7, wherein the reactor is a stirred tank reactor.

10. The process of claim 7, wherein the floating step includes separating the fine fraction into an oversized fine fraction and an undersized fine fraction, the oversized fine fraction having a mean particle size greater than a mean particle size of the undersized fine fraction and combining the oversized fine fraction with the coarse fraction before the floating step and wherein the undersized fine fraction represents no more than about 20 wt. % of the fine fraction and is the at least a portion of the fine fraction.

11. The process of claim 7, wherein the lixiviant is discrete from the first pregnant leach solution before the recovering step (g).

12. The process of claim 7, wherein the metal is selected from the group consisting of copper, gold, silver, nickel, zinc, arsenic, antimony, and mixtures thereof.

13. A process for recovering a metal from a feed material containing the metal and sulfides, comprising:

(a) comminuting the feed material to form a comminuted material having a $P_{80}$ size ranging from about 5 to about 20 mm;

(b) passing the comminuted material through a screen having an aperture size ranging from about 1 to about 3 mm to form an oversized fraction and an undersized fraction, the oversized fraction having a mean particle size greater than the undersized fraction, wherein the undersized fraction has a $P_{80}$ size ranging from about 10 to about 200 microns and the undersized fraction represents no more than about 30% by weight of the comminuted material;

(c) cycloning the undersized fraction to form a coarse undersized fraction and a fine undersized fraction, the coarse undersized fraction having a mean particle size greater than the fine undersized fraction and the fine undersized fraction representing no more than about 20 wt. % of the undersized fraction;

(d) floating at least a portion of the fine undersized fraction to form a tailing fraction and a concentrate fraction, wherein the concentrate fraction constitutes no more than about 5 wt % of the feed material;

(e) at least partially biooxidizing the concentrate fraction in a reactor to form a biooxidized fraction, wherein the biooxidized fraction includes an organism for oxidizing the sulfide sulfur in the concentrate fraction to form a first pregnant leach solution containing at least a portion of the metal in the concentrate fraction;

(f) separating at least most of the first pregnant leach solution from the biooxidized fraction;

(g) adding a second organism of a different species than the organism in the biooxidized fraction to at least one of the biooxidized fraction and the oversized fraction, the second organism flourishing at temperatures different from the organism present in the biooxidized fraction;

(h) thereafter combining at least a portion of the biooxidized fraction, which includes the organism, and at least a portion of the oversized fraction to form a combined feed material, wherein at least a portion of the oversized fraction has not been biooxidized in a reactor;

(i) biooxidizing the combined feed material to form a second pregnant leach solution containing at least a portion of the metal in the combined feed material; and (j) recovering the metal from the first and second pregnant leach solutions.

14. The process of claim 1, wherein the combining step comprises:

contacting at least one of the biooxidized fraction and oversized fraction of the feed material with a second organism from a species that is different from the organism, the second organism flourishing at a different temperature than the organism.

15. The process of claim 7, wherein the lixiviant is acidic and further comprising:

(h) after step (f) neutralizing the combined feed material with a base to form a neutralized combined feed material;

(i) contacting the neutralized combined feed material with a second lixiviant to dissolve a second metal contained in the neutralized combined feed material to form a third pregnant leach solution containing the dissolved second metal; and (j) recovering the second metal from the third pregnant leach solution.

16. The process of claim 7, further comprising after step (a) and before step (b):

cycloning the fine fraction to form an oversized fine fraction and an undersized fine fraction, the oversized fine fraction having a mean particle size greater than a mean particle size of the undersized fine fraction; and combining the oversized fine fraction with the coarse fraction and wherein in the floating step (b) the undersized fine fraction is the at least a portion of the fine fraction.

17. The process of claim 1, wherein the concentrate fraction constitutes no more than about 5 wt % of the feed material.

18. The process of claim 13, wherein in step (e), the concentrate fraction is in a slurry having a temperature ranging from about 20 to about 60° C., a pH ranging from about pH 1.2 to about pH 2.5, a sulfuric acid content ranging from about 1 to about 20 g/l, a concentration of $Fe^{2+}$ ranging from about 0.1 to about 10 g/l, an ammonium sulfate concentration ranging from about 0.1 to about 10 g/l, and a phosphate concentration ranging from about 0.05 to about 5 g/l.

19. The process of claim 1, further comprising after the at least partially biooxidizing step (e):

separating a slurry into the biooxidized fraction and a liquid fraction.

20. The process of claim 1, further comprising:

combining the coarse undersized fraction with the oversized fraction.

* * * * *